(12) United States Patent
Rychlik

(10) Patent No.: US 8,555,039 B2
(45) Date of Patent: Oct. 8, 2013

(54) SYSTEM AND METHOD FOR USING A LOCAL CONDITION CODE REGISTER FOR ACCELERATING CONDITIONAL INSTRUCTION EXECUTION IN A PIPELINE PROCESSOR

(75) Inventor: Bohuslav Rychlik, Morrisville, NC (US)

(73) Assignee: QUALCOMM Incorporated, San Diego, CA (US)

( * ) Notice: Subject to any disclaimer, the term of this patent is extended or adjusted under 35 U.S.C. 154(b) by 517 days.

(21) Appl. No.: 11/743,698

(22) Filed: May 3, 2007

(65) Prior Publication Data

US 2008/0276072 A1    Nov. 6, 2008

(51) Int. Cl.
*G06F 9/00*    (2006.01)
(52) U.S. Cl.
USPC ........................................................... 712/234
(58) Field of Classification Search
None
See application file for complete search history.

(56) References Cited

U.S. PATENT DOCUMENTS

| | | | |
|---|---|---|---|
| 4,654,785 A | | 3/1987 | Nishiyama et al. |
| 5,537,538 A | * | 7/1996 | Bratt et al. .................... 714/38.1 |
| 6,085,305 A | | 7/2000 | Panwar et al. |
| 6,629,235 B1 | * | 9/2003 | Flachs et al. ................... 712/226 |
| 2004/0044884 A1 | * | 3/2004 | Devereux ....................... 712/226 |
| 2004/0066385 A1 | * | 4/2004 | Kilgard et al. ................. 345/506 |

FOREIGN PATENT DOCUMENTS

JP        6043751 A        2/1994

OTHER PUBLICATIONS

International Search Report—PCT/US08/062652, International Search Authority—European Patent Office—Jul. 9, 2008.
Written Opinion—PCT/US08/062652, International Search Authority—European Patent Office—Jul. 9, 2008.

* cited by examiner

*Primary Examiner* — Andrew Caldwell
*Assistant Examiner* — John Lindlof
(74) *Attorney, Agent, or Firm* — Peter Michael Kamarchik; Nicholas J. Pauley; Joseph Agusta

(57) ABSTRACT

A method of executing a conditional instruction within a pipeline processor having a plurality of pipelines, the processor having a first condition code register associated with a first pipeline and a second condition code register associated with a second pipeline is disclosed. The method saves a most recent condition code value to either the first condition code register or the second condition code register. The method further sets an indicator indicating whether the second condition code register has the most recent condition code value and retrieves the most recent condition code value from either the first or second condition code register based on the indicator. The method uses the most recent condition code value to determine if the conditional instruction should be executed.

24 Claims, 6 Drawing Sheets

| INSTRUCTION: | OPERATION |
|---|---|
| A: | FCMP $F_0$, $F_1$ |
| B: | FMSTAT |
| C: | FCPYLT $F_0$, $F_1$ |
| D: | FCMP $F_0$, $F_2$ |
| E: | FMSTAT |
| F: | FCPYLT $F_0$, $F_2$ |

| CYCLE ~502 | ISSUE STAGE ~207 | RESERVATION STAGE ~310 | EXECUTION STAGE ~320 | INDICATOR ~208 |
|---|---|---|---|---|
| 1 | A | | | 0 |
| 2 | B | A | | 1 |
| 3 | C | B | A | 1 |
| 4 | D | C | B | 1 |
| 5 | E | D | C | 1 |
| 6 | F | E | D | 1 |
| 7 | | F | E | 1 |
| 8 | | | F | 1 |

FIG. 5

SYSTEM AND METHOD FOR USING A LOCAL CONDITION CODE REGISTER FOR ACCELERATING CONDITIONAL INSTRUCTION EXECUTION IN A PIPELINE PROCESSOR

FIELD OF DISCLOSURE

The present invention relates generally to computer systems, and more particularly to a method and a system for using a local condition code register to accelerate conditional instruction execution.

BACKGROUND

A processor pipeline is composed of many stages where each stage performs a specific function related to an instruction. Each stage is referred to as a pipe stage or pipe segment. The stages are connected together to form the pipeline. Instructions enter at one end of the pipeline and exit at the other end. The instructions flow sequentially in a stream through the pipeline stages. The stages are arranged so that several stages can be simultaneously processing several instructions. Simultaneously processing multiple instructions at different pipeline stages allows the processor to process instructions faster than processing one instruction at a time, thus improving the execution speed of the processor.

Within the processor, there may be multiple pipelines processing instructions. The individual pipelines may perform unique processor functions. For example, a processor may have one pipeline for executing integer instructions and another pipeline for executing floating point or vector instructions. By separating the pipelines based on functionality of the instruction, the processor may more efficiently utilize its resources when executing the instructions.

Some exemplary instructions that may be processed in the individual pipelines may be conditional instructions. As those skilled in the art appreciate, conditional instructions are instructions which will either execute or not execute if a condition is met or not met. In order to execute a conditional instruction, a condition code register is used to save the most recent condition code value which may be used in the processing of subsequent conditional instructions. The conditional instructions may be executed in any of the pipelines within the processor.

Commonly, in previous ARM (Advanced RISC Machine) processors, there was only one accessible or readable condition code register containing condition code values used to support multiple pipelines. This condition code register was physically located with only one pipeline but coupled to other pipelines. Having only one read accessible condition code register impacted the processor's execution especially when executing conditional instructions in the other remotely located pipelines. The efficiency impact is illustrated when conditional instructions are executed in pipelines having no local condition code register. The condition code value saved in the condition code register is sent to the requesting conditional instruction in the pipeline having no local condition code register when the conditional instruction attempts to execute. However, the condition code value may be updating from a previous instruction when the conditional instruction requests the condition code value. While the new condition code value is being written into the condition code register, the requesting conditional instruction may stall until the new condition code value is available. After the update of the condition code register is completed the new condition code value is read and sent back to the requesting conditional instruction in the pipeline having no local condition code register. As a result, the condition code value retrieval process in pipelines having no local condition code registers may take several processor cycles to complete. The delay in receiving the condition code value may be compounded if an instruction changing the condition code value is executed in the pipeline having no local condition code register and a subsequent conditional instruction executes in the same pipeline. In this instance, the subsequent conditional instruction may have to wait for the new conditional code value to update before it can be read and sent back to that pipeline.

SUMMARY OF THE DISCLOSURE

Accordingly there exists a need in the industry for a way of accelerating the execution of conditional instructions in multiple pipelines within a processor by creating a local copy of the condition code register for use in each of the pipelines. Providing a local copy of the condition code register to multiple pipelines speeds up the execution of conditional instructions in the pipelines and allows the processor to more effectively utilize its resources, thus increasing the processor's efficiency. The present disclosure recognizes this need and discloses such a processor.

A method of executing a conditional instruction within a pipeline processor having a plurality of pipelines, the pipeline processor having a first condition code register associated with a first pipeline and a second condition code register associated with a second pipeline is disclosed. The method saves a most recent condition code value to either the first condition code register or the second condition code register. The method further sets an indicator indicating whether the second condition code register has the most recent condition code value and retrieves the most recent condition code value from either the first or second condition code register based on the indicator.

The method determines whether the conditional instruction should be executed in response to the retrieved most recent condition code value.

A further method of executing a conditional instruction within a pipeline processor having a plurality of pipelines, the pipeline processor having a first condition code register associated with a first pipeline and a second condition code register associated with a second pipeline is disclosed. The method saves a most recent condition code value to either the first condition code register or the second condition code register. The method further sets an indicator in response to an instruction which sets a condition code when processed in an issue stage within the pipeline processor, wherein the condition code indicator indicates if the second pipeline has the most recent condition code value saved in the second condition code register. The method retrieves the most recent condition code value from either the first or second condition code register based on the indicator and determines whether the conditional instruction should be executed in response to the retrieved most recent condition code value.

A pipeline processor having a plurality of pipelines for executing instructions is disclosed. The pipeline processor has a first condition code register configured to accept a most recent condition code value, the first condition code register is associated with a first pipeline. The pipeline processor also has a second condition code register configured to accept the most recent condition code value. The second condition code register is associated with a second pipeline. The pipeline processor has an indicator which is configured to indicate whether the second condition code register has the most recent condition code value, wherein the processor is configured to retrieve the most recent condition code value based on the indicator and determines whether to execute a conditional instruction in response to the retrieved most recent condition code value.

A more complete understanding of the present invention, as well as further features and advantages of the invention, will be apparent from the following detailed description and the accompanying drawings.

BRIEF DESCRIPTION OF THE DRAWINGS

FIG. 5 shows a timing diagram of the exemplary group of instructions of FIG. 4 as they are executed through various stages of the processor of FIG. 1.

DETAILED DESCRIPTION

The detailed description set forth below in connection with the appended drawings is intended as a description of various embodiments of the present invention and is not intended to represent the only embodiments in which the present invention may be practiced. The detailed description includes specific details for the purpose of providing a thorough understanding of the present invention. However, it will be apparent to those skilled in the art that the present invention may be practiced without these specific details. In some instances, well-known structures and components are shown in block diagram form in order to avoid obscuring the concepts of the present invention. Acronyms and other descriptive terminology may be used merely for convenience and clarity and are not intended to limit the scope of the invention.

Figure 1:
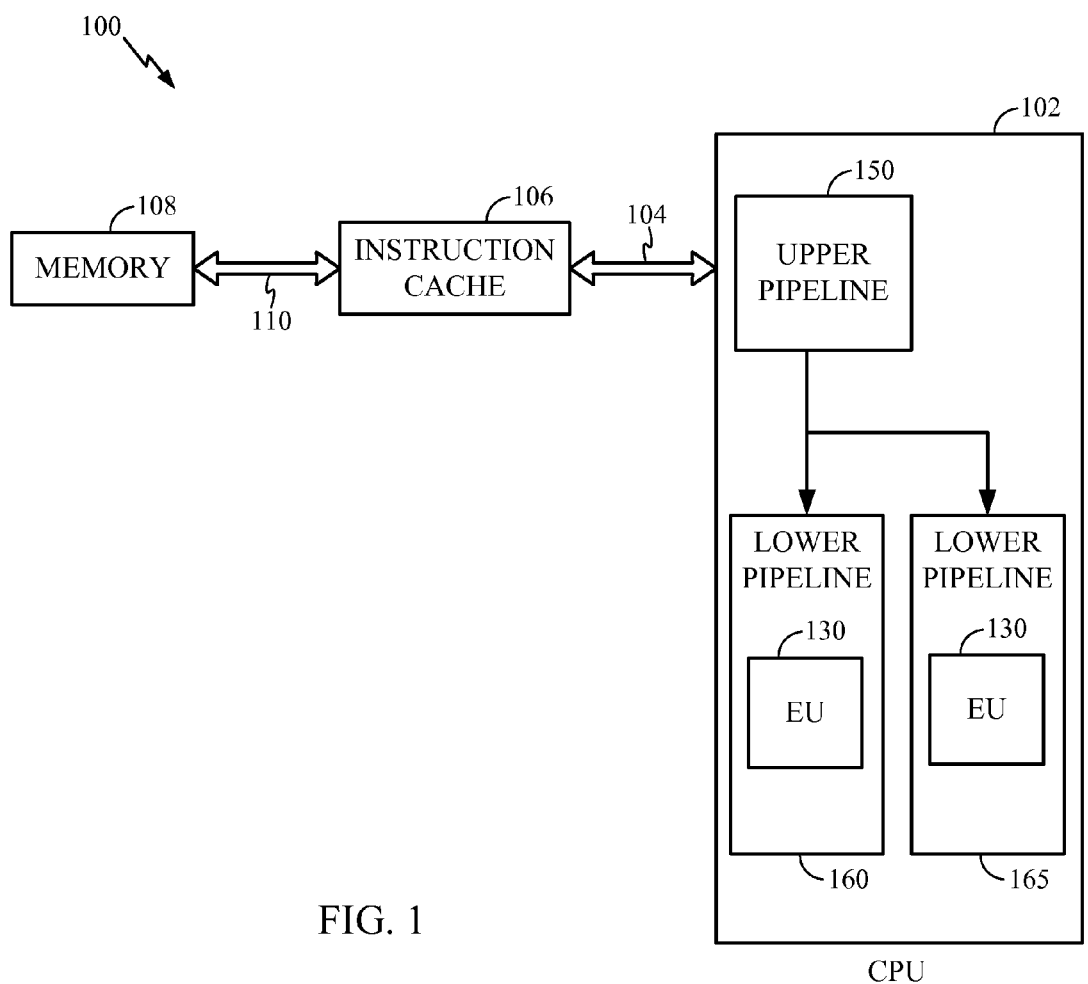
FIG. 1 shows a high level logic hardware block diagram of a processor using an embodiment of the present invention.

FIG. 1 shows a high level view of a superscalar processor 100 utilizing one embodiment of the present invention as hereinafter described. The processor 100 has a central processing unit (CPU) 102 that is coupled via a dedicated high speed bus 104 to an instruction cache 106. The instruction cache 106 is also coupled via a general purpose bus 110 to memory 108. The CPU 102 has an upper pipeline 150 coupled to lower pipelines 160 and 165. The CPU 102 controls the loading of instructions from memory 114 into the instruction cache 106. Once the instruction cache 106 is loaded with instructions, the CPU 102 is able to access them via the high speed bus 104. Instructions are fetched from the instruction cache 106 into the upper pipeline 150. After the instructions are processed in the upper pipeline 150 they are sent to the lower pipelines 160 or 165 for further processing. In one exemplary embodiment, the lower pipeline 160 may be an integer pipeline and lower pipeline 165 may be a floating point/vector pipeline.

Instructions leave the upper pipeline 150 in sequential program order. After leaving the upper pipeline 150 the instructions may be rearranged in the lower pipelines 160 or 165 for more efficient processing. Some exemplary processing functions performed on the instructions in the upper pipeline 150 include fetching the instruction, aligning the instruction, decoding the instruction, issuing the instruction to the lower pipelines 160 or 165 and the like. Within the lower pipelines 160 and 165 instruction processing may include, tracking the instruction, executing the instruction, recording the instruction results and the like.

Lower pipelines 160 and 165 may contain various execution units (EU) 130 such as arithmetic logic units, floating point units, store units, load units and the like. For example, an EU 130 may have arithmetic logic units for executing a wide range of arithmetic functions, such as integer addition, integer subtraction, integer multiplication, bitwise logic operations (e.g. AND, NOT, OR, XOR), bit shifting and the like.

Alternatively, the EU 130 may have execution units for performing floating point operations such as floating point compare, floating point copy and the like. In order to increase the efficiency of the processor 100, the lower pipelines 160 and 165 may be organized to perform certain functions. For example, the lower pipeline 160 may contain EUs 130 that execute integer instructions, while lower pipeline 165 may contain EUs 130 that execute floating point instructions. By segregating certain instruction functionality into separate lower pipelines 160 or 165, duplicate EUs 130 may not be required. The inventive concepts as presented herein may be applied to a processor with two or more lower pipelines.

Within the lower pipelines 160 and 165 condition code registers may keep track of the most recent codes as they are determined by the processor. The processor 100 tracks the status of some of these condition code registers by updating indicators associated with these condition code registers. The indicators as well as the condition code registers are further described in the discussions of FIGS. 2-5.

As those skilled in the art may appreciate, a pipeline stage may consist of a register or group of registers designed to hold an instruction. When an instruction enters a particular stage, the processor loads the instruction into the register or group of registers linked to that stage. Within each stage, logic circuits may perform certain operations, depending on the instruction. After the logic circuits have performed the intended operation, the instruction is then passed on to the next sequential stage.

Figure 2:
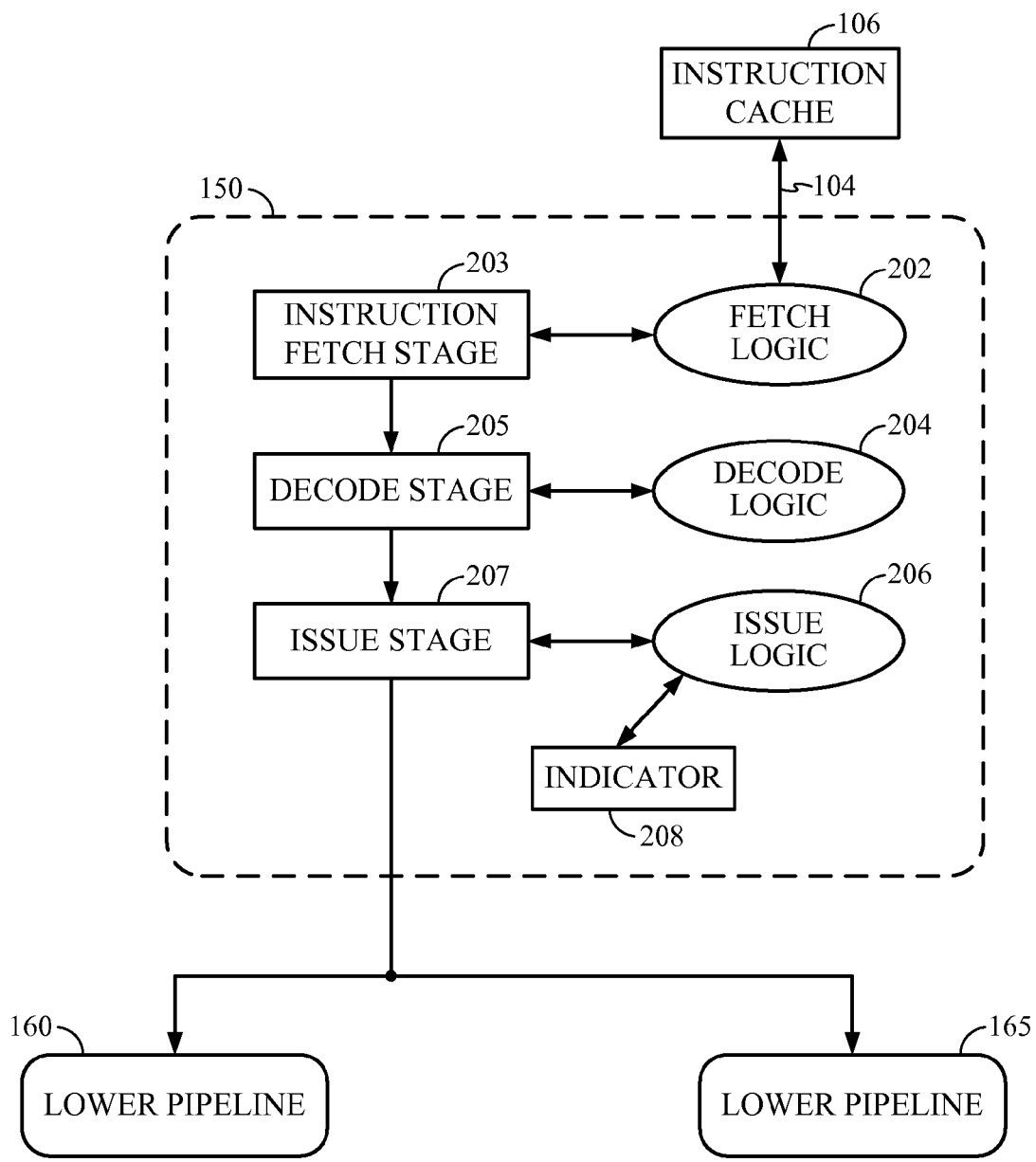
FIG. 2 displays a more detailed block diagram of the upper pipeline of the CPU of FIG. 1.

FIG. 2 displays a more detailed block diagram of the upper pipeline 150 of the CPU 102. The upper pipeline 150 has a fetch logic circuit 202 coupled to the instruction cache 106 by the high speed bus 104. The fetch logic circuit 202 is also coupled to an instruction fetch stage 203 which is coupled to a decode stage 205 which in turn is coupled to an issue stage 207. The decode stage 205 is also coupled to a decode logic circuit 204 and the issue stage 207 is coupled to an issue logic circuit 206 which communicates with a indicator 208 which tracks the most recent condition code. In the embodiment as displayed in FIG. 2, the indicator 208 may be linked to a condition code register associated (e.g. physically located or looked to by the processor within the pipeline when the processor processes an instruction requiring a condition code value) with one of the lower pipelines 160 or 165. The indicator 208 may contain a value indicating whether the condition code register in the associated pipeline contains the most recent condition code value. The most recent condition code value may change as the processor 100 processes instructions in the upper pipeline 150.

Instructions flow from the instruction fetch stage 203 through the decode stage 205 and the issue stage 207. From the issue stage 207 instructions are sent to the lower pipelines 160 and 165. Within the upper pipeline 150, the fetch logic circuit 202 determines and subsequently fetches instructions from the instruction cache 106. In the instruction cache 106, instructions are grouped into sections known as cache lines.

Each cache line may contain multiple instructions. As a result, instructions may be fetched and decoded from the instruction cache 106 several instructions at a time. After the instructions are fetched by the fetch logic circuit 202, the instructions are sent to the decode stage 205.

In the decode stage 205, the instructions are decoded by the decode logic circuit 204 to determine the identity of the instruction. Information retrieved or identified during the decode stage 205 by decode logic circuit 204 allows the processor 100 to determine which of the lower pipelines 160 or 165 will receive the instruction for further processing. The issue stage 207, and more specifically, the issue logic circuit 206, determines which lower pipeline 160 or 165 will receive the instructions. The lower pipeline 160 may be designed to execute integer instructions while lower pipeline 165 may be designed to execute floating point instructions. The issue logic circuit 206 sends the instructions to the appropriate lower pipeline 160 or 165 for execution. When the issue logic circuit 206 sends the instruction on to the appropriate lower pipeline 160 or 165, the issue logic circuit 206 may also update the indicator 208. The indicator 208 is updated to reflect that the local condition code register in the associated pipeline will contain the most recent condition code after the particular instruction executes.

In one embodiment, the indicator 208 is used by the processor 100 to identify if a local condition code register in the lower pipeline 165 contains the most recent condition code value when the instruction is processed in the issue stage 207. The most recent condition code value is used by the processor 100 to determine if a conditional instruction may or may not execute. As those skilled in the art appreciate, the condition code value within an ARM processor may correspond to the NZCV status bits (N=Negative, Z=Zero, C=Carry, V=Overflow). The condition code value or NZCV bits may also be referred to as condition flags. In this embodiment, the indicator 208 is a single status bit saved in a register where a "1" in the indicator 208 may indicate that the local condition code register in the lower pipeline 165 may have the most recent condition code value. Correspondingly, a "0" in the indicator 208 may indicate that the local condition register in the lower pipeline 165 does not contain the most recent condition code value, and by default a global condition code register in the lower pipeline 160 may contain the most recent condition code value. The indicator 208 as well as the condition code registers in each of the pipelines are further described in the in the discussions of FIGS. 3-5.

Figure 3:
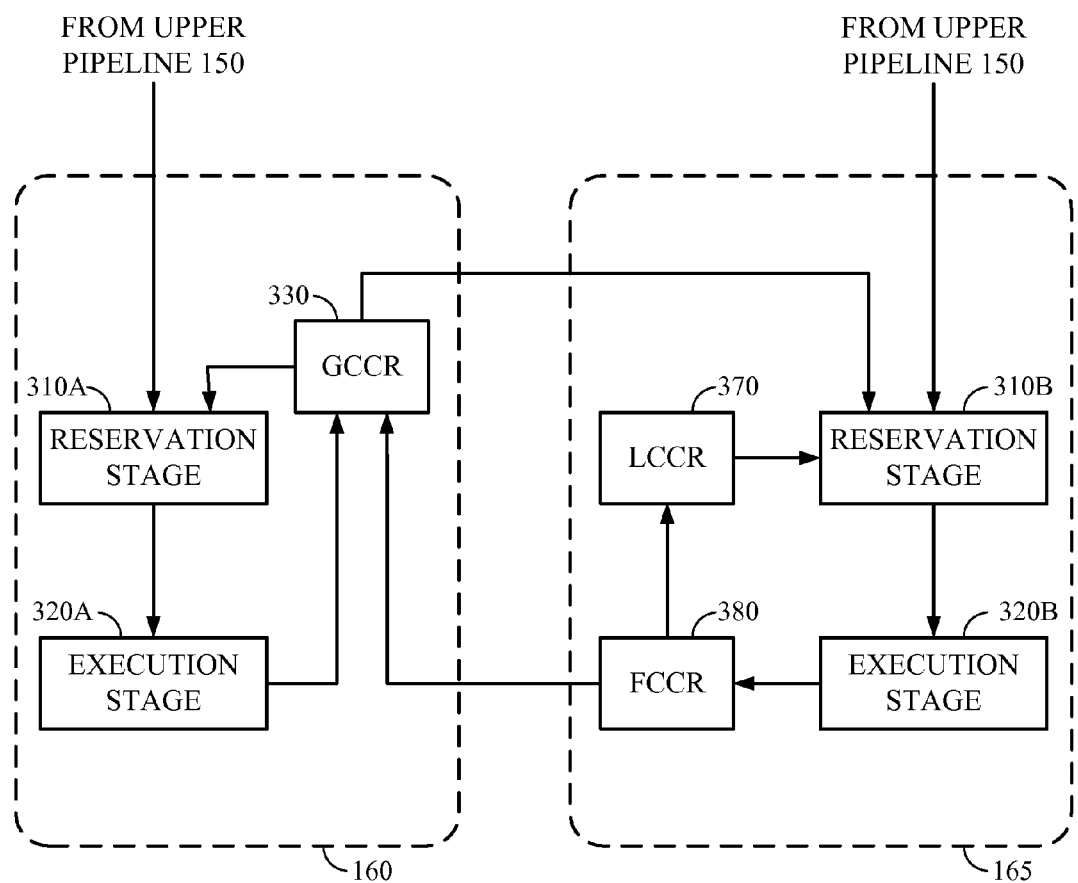
FIG. 3 displays a more detailed block diagram of the lower pipelines of the CPU of FIG. 1.

FIGS. 3 displays a more detailed view of the lower pipelines 160 and 165 utilizing one embodiment of the present invention. Using the previously described illustrative example, the lower pipeline 160 may execute integer instructions and the lower pipeline 165 may execute floating point instructions. The lower pipeline 160 has a reservation stage 310A, an execution stage 320A and a global condition code register (GCCR) 330. The GCCR 330 may also be referred to in the art as a CPSR (Central Processing Status Register) and may provide condition code values to both lower pipelines 160 and 165. Lower pipeline 165 has a reservation stage 310B, an execution stage 320B, a local condition code register (LCCR) 370 and a floating point condition code register (FCCR) 380. The FCCR 380 may also be referred to in the industry as a FPSCR (floating point status control register).

When instructions leave the issue stage 207, integer instructions are sent to the lower pipeline 160 and floating point instructions are sent to the lower pipeline 165. The reservation stages 310A-310B and execution stages 320A-320B in both lower pipelines 160 and 165 may perform similar functions as is described below.

As instructions enter the lower pipelines 160 or 165, they are first processed in the reservation stage 310A-310B by reservation logic (not shown for ease of illustration). The instructions may be held in the reservation stages 310A-310B for one or more processor cycles if the instructions require additional information in order to execute. For example, when a conditional instruction is loaded into either reservation stages 310A or 310B, the processor 100 may identify that the most recent condition code value may be required to determine whether the conditional instruction executes or not. The conditional instruction is held in the reservation stage, 310A or 310B, until the most recent condition code value is retrieved. After the most recent condition code value is received, the conditional instruction is dispatched from the reservation stage, 310A or 310B, to the execution stage 320A or 320B. After the instruction executes, the results from the instruction execution are saved by the processor 100 and written to a register file (not shown for ease of illustration) for use by any subsequent instructions.

The condition code value saved in the GCCR 330 may change after the processor 100 executes certain instructions such as a positive integer compare (CMP), a negative integer compare (CMN), a floating point compare (FCMP) with an associated update instruction, and the like. Similarly, the condition code value saved in the LCCR 370 may change when a floating point compare instruction (FCMP) and the associated floating point update instruction are executed in the lower pipeline 165. As those skilled in the art appreciate, one exemplary floating point update instruction executed in the floating point pipeline is the FMSTAT instruction. In the embodiment displayed in FIG. 3, the LCCR 370 may be used by its associated pipeline (i.e. lower pipeline 165) when the LCCR 370 contains the most recent condition code value and a conditional floating point instruction is executed in associated pipeline 165. As is explained in greater detail in the discussions of FIG. 4 and 5, the GCCR 330 will eventually sync up and contain the same condition code value that may be saved in the LCCR 370. If the processor 100 has other lower pipelines (not shown for ease of illustration), the value saved in the GCCR 330 may be used when conditional instructions are executed in these lower pipelines and the associated local condition code registers do not contain the most recent condition code value.

Conventional processors required all pipelines to use the condition code value saved in the GCCR to process conditional instructions. In these conventional processors, the GCCR was physically located within one pipeline such as the integer pipeline and as a result, any conditional instruction executed in another pipeline, such as the floating point pipeline, had to retrieve the most recent condition code value from the GCCR before it could execute. As a result, conventional processors may experience a delay when executing a conditional instruction in a pipeline not physically located with the GCCR.

To alleviate the potential delay as described in the Background, one embodiment uses the LCCR 370 to provide the most recent condition code value in its associated pipeline for conditional floating point instructions. Using the LCCR 370, the processor 100 may not need to wait for the GCCR update and the retrieval functions to complete before executing a conditional floating point instruction. In this embodiment, the processor 100 uses the indicator 208 to identify if the LCCR 370 contains the most recent condition code value. If the indicator 208 indicates that the LCCR 370 contains the most recent condition code value, the most recent condition code value is retrieved from the LCCR 370 and sent to the conditional floating point instruction while it is in the reservation stage 310B in the lower pipeline 165. If the indicator 208 indicates that the LCCR 370 does not contain the most recent condition code value (i.e. the GCCR 330 contains the most recent condition code value), the value in the GCCR 330 is retrieved and subsequently sent to the reservation stage 310B of lower pipeline 165 when a conditional floating point instruction is executed.

When the conditional floating point instruction is processed in the issue stage 207, the value in the indicator 208 is captured. In one embodiment, the value in the indicator 208 follows the conditional floating point instruction as it is processed in the lower pipeline 165. In this embodiment, the decision to use the condition code value in the LCCR 370 is made by the processor 100 when the conditional floating point instruction executes in the execution stage 320B of the lower pipeline 165. In an alternative embodiment, the processor 100 reads the value in the indicator 208 and decides whether or not to use the condition code value saved in the LCCR 370 when the conditional floating point instruction is processed in the issue stage 207.

The value in the indicator 208 reflects the status of the LCCR 370 when the particular conditional floating point instruction is processed in the issue stage 207. Thus, the processor 100 determines if the LCCR 370 contains the most recent condition code value prior to the instruction entering the lower pipeline 165. Based on this determination, the processor 100 uses the value saved in the LCCR 370 when the indicator 208 is a "1". If the indicator is a "0" when the conditional floating point instruction was processed in the issue stage 207, the most recent condition code value in the GCCR 330 is retrieved and used when the conditional floating point instruction is executed in the lower pipeline 165.

In order to increase processing efficiency, the GCCR 330 may be updated with the most recent condition code value when the processor 100 updates the LCCR 370. In one embodiment, the processor 100 updates both the LCCR 370 and the GCCR 330 when a floating point update instruction (FMSTAT) is executed. Updating the GCCR 330 may take longer than updating the LCCR 370 due to the fact that the LCCR 370 is located within the floating point pipeline and the GCCR 330 is located in another pipeline (i.e. the integer pipeline). The update of the GCCR 330 may also require additional processing steps to ensure that the update does not cause any data hazards such as a WAW (write after write), RAW (read after write), and WAR (write after read) violations. These data hazards may exist if the update overwrites the value of the GCCR 330 before the value is used to execute a pending conditional integer instruction. After the GCCR 330 is updated with the most recent condition code value, the processor 100 is able to use the most recent condition code value within the GCCR 330 to execute any subsequent conditional instructions.

One way the processor 100 updates both the GCCR 330 and the LCCR 370 with the most recent condition code value is to utilize the FCCR 380. The FCCR 380 may be a write only register that is not read accessible (i.e. the condition code value may not be read from the FCCR 380 and used to determine the conditionality of conditional instructions). The condition code value saved in the FCCR 380 is used to update the LCCR 370 and the GCCR 330.

In the embodiment, the condition code value in the FCCR 380 is updated when the floating point compare instruction finishes execution. The LCCR 370 is updated with the value saved in the FCCR 380 after the floating point update instruction (FMSTAT) is executed. The update of the GCCR 330 is initiated by the FMSTAT instruction but may not physically update until several processor cycles after the FMSTAT instruction executes in the floating point pipeline. Separating the FCCR 380 from the LCCR 370 enables the two registers to operate independently from each other. Operating independently allows the LCCR 370 to be used to process subsequent conditional floating point instructions while the GCCR 330 is physically being updated.

Figure 4:
FIG. 4 shows an exemplary group of instructions executed by the processor of FIG. 1.

FIG. 4 displays an exemplary group of instructions 400 executed by the processor of FIG. 1. The group of instructions 400 may be executed in the floating point pipeline (i.e. the lower pipeline 165). The group of instructions 400 compares floating point values saved in various floating point registers and identifies the smallest value. Once the smallest value is determined, the processor 100 may take a specific action based on the smallest value.

Instruction A in the group of instructions 400 is a floating point compare instruction which takes the value saved in register $F_0$ and compares it to the value saved in register $F_1$. The result of executing instruction A may change the condition code value in the FCCR 380. Instruction B is a floating point update instruction, which updates the GCCR 330, and the LCCR 370 with the new condition code value saved in the FCCR 380. Instruction C is a conditional floating point instruction, specifically copying the results of $F_0$ into $F_1$ if the value saved in $F_1$ was less than $F_0$. Instruction D is another floating point compare instruction, comparing the value saved in register $F_2$ with the possible new value saved in $F_1$. After instruction D executes, the condition code value in the FCCR 380 may change. Instruction E is another floating point update instruction, which updates the GCCR 330 and the LCCR 370 with the new condition code value determined by instruction D. Instruction F is a conditional floating point instruction, specifically copying the results of $F_2$ into $F_0$ if the value saved in $F_2$ was less than $F_0$.

FIG. 5 displays a timing diagram 500 of the group of instructions 400 as they are sent from the issue stage 207 and are executed in the stages within the lower pipeline 165. In the timing diagram 500, the processor cycle 502 is displayed along the Y-Axis 504 while the stage (issue stage 207, reservation stage 310B and execution stage 320B) and the indicator 208 within the processor 100 are identified along the X-Axis 506. For ease of illustration purposes, the timing diagram displays one instruction being processed by the processor 100 in each processor cycle. However, the processor 100 may process multiple instructions per processor cycle. The teachings presented herein may be applied to a single instruction issue or multiple instruction issue processors. Additionally, the value of the indicator 208 is initially a "0" prior to processor cycle 1.

As shown in FIG. 5, instruction A is processed in the issue stage 207 by the issue logic circuit 206 in processor cycle 1. Since instruction A is a floating point compare instruction, the processor 100 directs instruction A to the floating point pipeline (in this example lower pipeline 165). As shown in FIG. 5, the indicator 208 is a "0," in processor cycle 1. The "0" indicates that the GCCR 330 in the integer pipeline contains the most recent condition code value, and by default, the LCCR 370 does not contain the most recent condition code value. The indicator 208 is set to a "0" whenever an integer instruction such as a compare instruction is executed in the integer pipeline (lower pipeline 160), and as a result the GCCR 330 contains the most recent condition code register.

In processor cycle 2, instruction A is processed in the reservation stage 310B and instruction B is processed in the issue stage 207. Instruction A does not encounter any condition that would keep instruction A in the reservation stage 310B and as a result instruction A is dispatched to the execution stage 320B during the next processor cycle. While instruction B is processed in the issue stage 207, the issue logic circuit 206 determines that instruction B is a floating point update instruction. As a result, the issue logic circuit 206 changes the indicator 208 in processor cycle 2 to reflect that instruction B will update the LCCR 370 with the most recent condition code value when instruction B executes. The new value of the indicator 208 is a "1," signifying that the LCCR 370 will have the most recent condition code value once instruction B executes.

Since instruction B is a floating point update instruction (FMSTAT), instruction B may be duplicated by the issue logic circuit 206 and the duplicate instruction is sent to the integer pipeline (lower pipeline 160). The duplicate instruction also referred to as a shadow instruction which is not executed within the integer pipeline but is instead used as a marker to coordinate the update from the FCCR 380 to the GCCR 330. The duplicate instruction may be needed because the update of the GCCR 330 may require additional activities and coordination between the floating point pipeline (lower pipeline 165) and the integer pipeline (lower pipeline 160). When the shadow instruction B is in the execution stage 320A of the integer pipeline (lower pipeline 160), the value of the FCCR 380 is read and the update of the GCCR 330 is performed. For ease of illustration, the progress of instruction B through the integer pipeline is not shown.

In processor cycle 3, instruction A executes while in the execution stage 320B, instruction B is processed in the reservation stage 310B, and instruction C is processed in the issue stage 207. After instruction A finishes executing, the processor 100 updates the FCCR 380 with a new condition code value. Since instruction B does not encounter any stalling conditions, instruction B is dispatched to the execution stage 320B at the end of processor cycle 3. Instruction C is processed by the issue logic circuit 206 in the issue stage 207 during processor cycle 3. The issue logic circuit 206 identifies that instruction C is a conditional floating point instruction which requires the most recent condition code value. The processor 100 accesses the indicator 208 and determines that the indicator 208 is a "1" and therefore the LCCR 370 will contain the most recent condition code value after instruction B executes. Instruction C is sent to the floating point pipeline (lower pipeline 165) for execution.

In processor cycle 4, instruction D is processed in the issue stage 207 by the issue logic circuit 206, instruction C enters the reservation stage 310B and instruction B is executed in the execution stage 320B. Since instruction D is a floating point compare instruction, it is sent to the floating point pipeline (lower pipeline 165) at the end of processor cycle 4. Instruction C is processed in the reservation stage 310B for one processor cycle. The value of the indicator 208 identified that the LCCR 370 will have the most recent condition code value when instruction C executes. The most recent condition code value is available once instruction B executes (at the end of processor cycle 4), so instruction C will remain in the reservation stage 310B for one processor cycle. When the condition code value becomes available, it is sent to instruction C while it is in the reservation stage 310B and instruction C is released to the execution stage 320B at the beginning of the next processor cycle (processor cycle 5).

When instruction B executes in processor cycle 4, the FCCR 380 writes the updated condition code value into the LCCR 370. The processor 100 waits for the shadow instruction B to reach the execution stage 320A in the integer pipeline (lower pipeline 160) before it sends the condition code value in the FCCR 380 to the integer pipeline to update the GCCR 330. As mentioned previously, this update may not occur until several processor cycles after the LCCR 370 is updated.

In processor cycle 5, instruction E is processed by the issue logic circuit 206 while it is in the issue stage 207. The issue logic circuit 206 updates the indicator 208 to indicate that the LCCR 370 will contain the most recent condition code value after instruction E executes. In this illustrative example, the value of the indicator 208 remains the same since there was no intervening integer compare instruction. Since instruction E is a floating point update instruction (FMSTAT), instruction E may be duplicated by the issue logic circuit 206 and the duplicate instruction may be sent to the integer pipeline similar to instruction B. As mentioned previously the duplicate instruction is a "shadow" instruction which is not executed by the integer pipeline but used as a marker to coordinate the update from the FCCR 380 to the GCCR 330 when the shadow instruction E reaches the execution stage 320A in the integer pipeline. During processor cycle 5, instruction C is dispatched to the execution stage 320B while instruction D is loaded into the reservation stage 310B. Instruction D does not encounter any condition that would cause it to stall in the reservation stage 310B and will dispatch to the execution stage 320B in the next processor cycle.

In processor cycle 6, instruction D is dispatched to the execution stage 320B. After instruction D executes, the FCCR 380 may be updated with the new condition code value as determined by instruction D. Also in processor cycle 6, instruction E enters the reservation stage 310B, and instruction F is processed in the issue stage 207 by the issue logic circuit 206. Because Instruction F is a conditional floating point instruction, it needs the most recent condition code value in order to execute. Identified by the value of the indicator 208, the most recent condition code value will be contained in the LCCR 370 when instruction F executes. In this example, the most recent condition code value may change in the LCCR 370 after instruction E executes (at the end of processor cycle 7).

When instruction E executes in processor cycle 7, the FCCR 380 writes the updated condition code value into the LCCR 370. The processor 100 waits until the shadow instruction E reaches the execution stage 320A in the integer pipeline before it sends the value of the FCCR 380 to the GCCR 330 in the integer pipeline. As mentioned previously, the update of the GCCR 330 may not occur until several processor cycles after the LCCR 370 is updated.

The most recent condition code value is available for instruction F once instruction E executes (at the end of processor cycle 7) and the LCCR 370 is updated. As a result, instruction F will remain in the reservation stage 310B for one processor cycle. In processor cycle 8, instruction F is loaded into the execution stage 320B and is executed.

If the same group of instructions 400 were executed in a floating point pipeline without the LCCR 370, the processor 100 would have to retrieve the condition code value in the GCCR 330 each time conditional floating point instructions are executed. As mentioned previously, the update of the GCCR 330 may require several additional processor cycles to update after instruction B executes in the floating point pipeline (lower pipeline 165). The shadow instruction B may encounter a resource hazard and stall in the reservation stage 310A in the integer pipeline for several processor cycles, compounding the delay in executing instruction C and subsequently instruction F. Instructions C and F would stall in the reservation stage 310B in the floating point pipeline (lower pipeline 165) until the most recent condition code value was first written into and then retrieved from GCCR 330. By utilizing the LCCR 370, conditional floating point instructions such as instruction C and F may execute without experiencing delay caused by retrieving the most recent condition code from the GCCR 330, thus accelerating the execution of instructions and increasing the efficiency of the processor 100.

Figure 6:
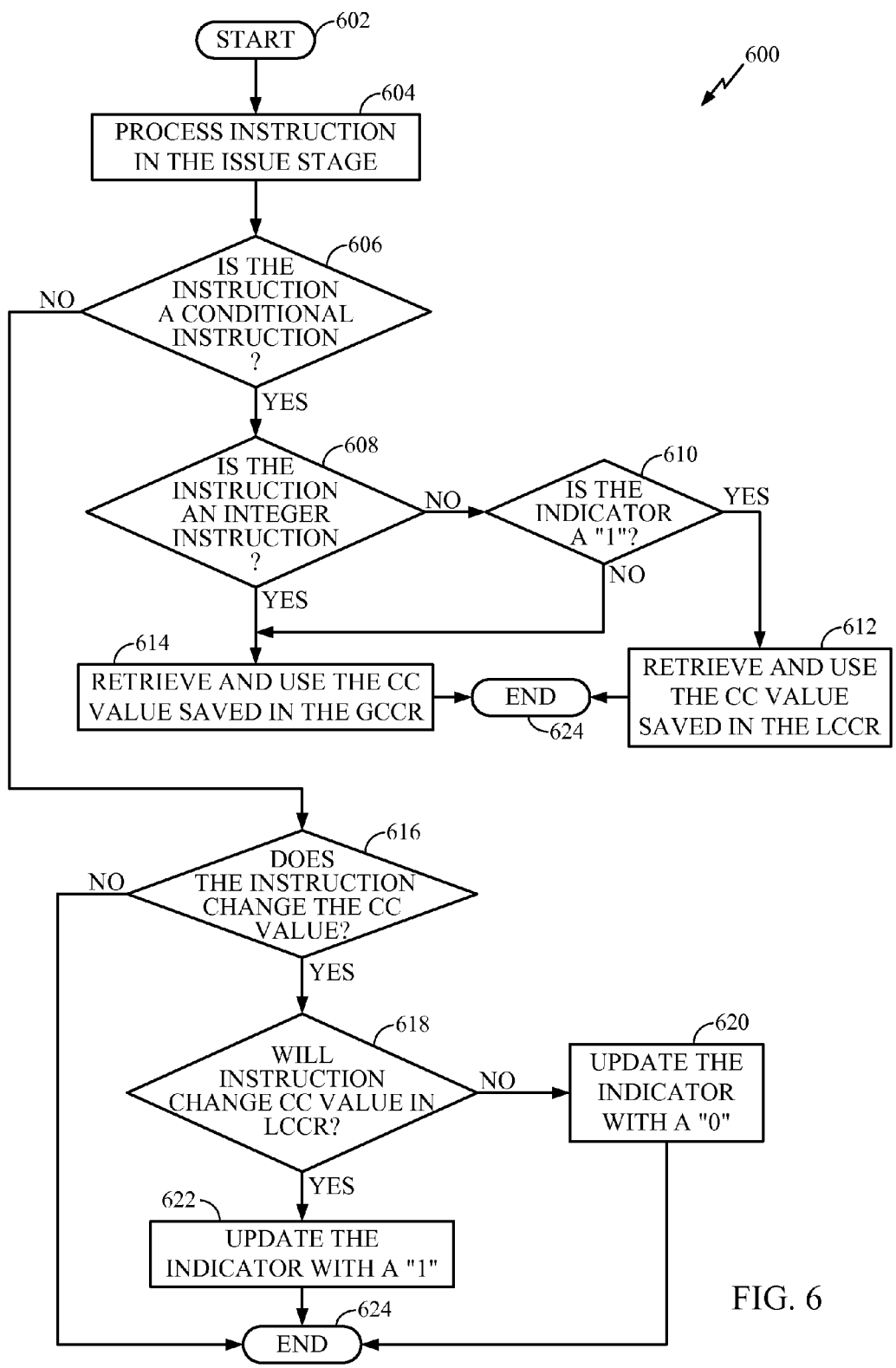
FIG. 6 shows a flow chart illustrating an exemplary instruction flow through the upper and lower pipelines of the processor of FIG. 1.

FIG. 6 is a flow chart illustrating a method 600 performed by one embodiment of the present invention. The method 600 begins at start block 602 when the instruction enters the issue stage 207. At block 604, the processor 100 uses the issue logic circuit 206 to processes the instruction. After processing the instruction at block 604, the method 600 proceeds to decision block 606.

At decision block 606, the processor 100 determines if the instruction is a conditional instruction. If the instruction is a conditional instruction, the most recent condition code value is needed in order to execute the conditional instruction and the method 600 proceeds to decision block 608. If the instruction is not a conditional instruction, the method 600 proceeds to block 616. At decision block 608, the processor 100 determines if the instruction is a conditional integer instruction. If the instruction is a conditional integer instruction, the method proceeds to block 614 and the condition code value saved in the GCCR 330 is retrieved. If the conditional instruction is not a conditional instruction (i.e. it is a floating point instruction), the method 600 proceeds from decision block 608 to decision block 610.

At decision block 610, the processor 100 determines if the indicator 208 is a "1." If the indicator 208 is a "1", then the LCCR 370 contains the most recent condition code value when the conditional instruction was processed in the issue stage 207. As a result, the method 600 continues to block 612. At block 612, the processor 100 retrieves the condition code value saved in the LCCR 370 and uses the retrieved condition code value to determine whether the conditional instruction should be executed. From block 612 the method ends at block 624.

If at decision block 610 the processor 100 determines that the indicator 208 is not a "1"(i.e. it is a "0"), by default, the most recent condition code value is in the GCCR 330. The processor 100 identified that the value of the indicator 208 was a "0" when the conditional instruction is processed during the issue stage 207. When the indicator is not a "1", the method 600 proceeds to block 614. At block 614, the processor 100 retrieves the most recent condition code value from the GCCR 330 and the retrieved condition code value is used to determine whether the conditional instruction should be executed. From block 614, the method 600 ends at block 624.

In decision block 616, the processor 100 determines if the instruction processed in the issue stage by issue logic circuit 206 will change the condition code (CC) value. As mentioned previously, an integer compare instruction and a floating point compare instruction along with the FMSTAT instruction are just two examples of instructions that may change the condition code value. If the instruction changes the condition code value, the method 600 continues to decision block 618. If the instruction does not change the condition code value, the method 600 ends at block 624.

At decision block 618, the processor 100 determines if the condition code value in the local condition code register (LCCR) 370 will be modified. Referring back to the previously described illustrative example, the FMSTAT instruction changes the condition code value in the LCCR 370. In contrast, the integer compare instruction changes the condition code value in the GCCR 330 and does not change the condition code value the LCCR 370. If the instruction is an integer compare instruction, the method 600 proceeds to block 620 and a "0" is written into the indicator 208. Alternatively, if at decision block 618 the processor 100 determines that the instruction is an FMSTAT instruction, the method 600 proceeds to block 622. At block 622, the processor writes a "1" into the indicator 208 to signify that the LCCR 370 contains the most recent condition code when the FMSTAT instruction executes. From blocks 620 and 622, the method 600 ends at block 624.

The various illustrative logical blocks, modules, circuits, elements, and/or components described in connection with the embodiments disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing components, e.g., a combination of a DSP and a microprocessor, a plurality of microprocessors, one or more microprocessors in conjunction with a DSP core, or any other such configuration.

Although specific embodiments have been illustrated and described herein, those of ordinary skill in the art appreciate that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method of executing a conditional instruction within a pipeline processor having multiple pipelines, the pipeline processor having a first condition code register associated with a first pipeline and a second condition code register associated with a second pipeline, the method comprising:
    saving a most recent condition code value to the first condition code register when saving the most recent condition code value to the second condition code register;
    setting a condition code indicator to have a first value or a second value in response to an instruction that sets the most recent condition code value when processed, wherein the first value of the condition code indicator indicates that the second condition code register has the most recent condition code value and wherein the second value of the condition code indicator indicates that the second condition code register has a condition code value that is different from the most recent condition code value;
    retrieving the most recent condition code value from one of the first condition code register or the second condition code register based on the condition code indicator; and
    determining whether the conditional instruction should be executed in response to the retrieved most recent condition code value.

2. The method of claim 1, wherein the first condition code register is a global register, wherein the second condition code register is a local register that is local to the second pipeline, and wherein, when the global register and the local register hold the most recent condition code value and the condition code indicator holds the first value that indicates that the local register has the most recent condition code value:

the most recent condition code value is retrieved from the global register, without updating the global register, for use by the first pipeline, and
the most recent condition code value is retrieved from the local register for use by the second pipeline.

3. The method of claim 1, wherein the second pipeline executes floating point instructions and the most recent condition code value is saved automatically to the first condition code register and to the second condition code register in response to executing a floating point update instruction.

4. The method of claim 1, wherein the first condition code register is a global condition code register.

5. The method of claim 1, wherein the second condition code register is a local condition code register.

6. The method of claim 1, wherein the first condition code register contains a first set of negative, zero, carry, and overflow condition bits and wherein the second condition code register contains a second set of negative, zero, carry, and overflow condition bits.

7. The method of claim 1, wherein the condition code indicator is a single status bit.

8. A pipeline processor comprising:
a plurality of pipelines to execute instructions;
a first condition code register associated with a first pipeline;
a second condition code register associated with a second pipeline;
a third condition code register configured to receive a condition code value from execution stage logic of the second pipeline, wherein the first condition code register and the second condition code register are updated with the condition code value from the third condition code register; and
a condition code indicator, the condition code indicator configured to indicate whether the second condition code register contains a most recent condition code value, wherein the pipeline processor is configured to update the most recent condition code value of the first condition code register and the most recent condition code value of the second condition code register when a floating point update instruction is executed and wherein the processor is configured to retrieve the most recent condition code value from one of the first condition code register and the second condition code register based on the condition code indicator and to determine whether to execute a conditional instruction in response to the retrieved most recent condition code value.

9. The pipeline processor of claim 8, wherein the second pipeline executes floating point instructions.

10. The pipeline processor of claim 8, wherein the first condition code register is a global condition code register.

11. The pipeline processor of claim 8, wherein the second condition code register is a local condition code register.

12. The pipeline processor of claim 8, wherein the first pipeline is configured to retrieve the most recent condition code value from the first condition code register independent of the condition code indicator.

13. A pipeline processor comprising:
means for saving a most recent condition code value to a first condition code register when saving the most recent condition code value to a second condition code register;
means for setting a condition code indicator in response to an instruction that sets the most recent condition code value when processed, wherein a first value of the condition code indicator indicates that the second condition code register has the most recent condition code value and wherein a second value of the condition code indicator indicates that the second condition code register has a condition code value that is different from the most recent condition code value;
means for retrieving the most recent condition code value from one of the first condition code register and the second condition code register based on the condition code indicator; and
means for determining whether a conditional instruction should be executed in response to the retrieved most recent condition code value.

14. The pipeline processor of claim 13, further comprising pipeline means for executing integer instructions.

15. The pipeline processor of claim 13, further comprising pipeline means for executing floating point instructions.

16. The pipeline processor of claim 13, wherein the first condition code register is a global condition code register.

17. The pipeline processor of claim 13, wherein the second condition code register is a local condition code register.

18. The pipeline processor of claim 13, wherein the condition code value contains negative, zero, carry, and overflow condition bits.

19. The method of claim 1, wherein an issue stage communicates with the condition code indicator via issue logic.

20. The method of claim 19, wherein the issue logic is configured to send decoded instructions from the issue stage to one of multiple lower pipelines for execution by an execution unit.

21. The method of claim 1, wherein issue stage is configured to receive decoded instructions from a decode stage of the pipeline processor.

22. The pipeline processor of claim 8, wherein the third condition code register is updated in response to the second pipeline executing an instruction that changes the most recent condition code value.

23. A non-transitory computer-readable medium including program code that, when executed by a processor, causes the processor to:
save a most recent condition code value to a first condition code register when saving the most recent condition code to a second condition code register, wherein the first condition code register is associated with a first pipeline and wherein the second condition code register is associated with a second pipeline;
set a condition code indicator to have a first value or a second value in response to an instruction that sets the most recent condition code value when processed, wherein the first value of the condition code indicator indicates that the second condition code register has the most recent condition code value and wherein the second value of the condition code indicator indicates that the second condition code register has a condition code value that is different from the most recent condition code value;
retrieve the most recent condition code value from one of the first condition code register and the second condition code register based on the condition code indicator; and
determine whether a conditional instruction should be executed in response to the retrieved most recent condition code value.

24. The non-transitory computer-readable medium of claim 23, wherein the second pipeline is configured to execute floating point instructions and the most recent condition code value is saved automatically to the first condition code register and to the second condition code register in response to executing a floating point update instruction by the second pipeline.

* * * * *